(12) United States Patent
Turk, Jr. et al.

(10) Patent No.: US 10,947,135 B2
(45) Date of Patent: Mar. 16, 2021

(54) FLUID PURIFICATION METHODS, DEVICES, AND SYSTEMS

(71) Applicant: NxStage Medical, Inc., Lawrence, MA (US)

(72) Inventors: Joseph E. Turk, Jr., North Andover, MA (US); William K. Weigel, York, ME (US); Goetz Friederichs, Boston, MA (US); Jeffery B. Hover, Altamont, NY (US)

(73) Assignee: NxStage Medical, Inc., Lawrence, MA (US)

( * ) Notice: Subject to any disclaimer, the term of this patent is extended or adjusted under 35 U.S.C. 154(b) by 176 days.

(21) Appl. No.: 16/200,869

(22) Filed: Nov. 27, 2018

(65) Prior Publication Data
US 2019/0092660 A1 Mar. 28, 2019

Related U.S. Application Data

(63) Continuation of application No. 15/214,438, filed on Jul. 19, 2016, now Pat. No. 10,189,728, which is a (Continued)

(51) Int. Cl.
*C02F 1/469* (2006.01)
*B01D 61/42* (2006.01)
(Continued)

(52) U.S. Cl.
CPC ............ *C02F 1/4695* (2013.01); *B01D 61/42* (2013.01); *B01D 61/54* (2013.01); *C02F 1/006* (2013.01);
(Continued)

(58) Field of Classification Search
CPC ........ B01D 61/48; B01D 61/42; B01D 61/44; B01D 61/445; B01D 61/50; B01D 61/54; B01D 2317/02; B01D 2317/025; B01D 2317/17; B01D 2317/06; B01D 2313/18; B01D 2321/04; B01D 2321/12; B01D 2321/40; C02F 1/469; C02F 1/4693;
(Continued)

(56) References Cited

U.S. PATENT DOCUMENTS 2,788,319 A 4/1957 Pearson
2,860,095 A 11/1958 Katz et al.
(Continued)

FOREIGN PATENT DOCUMENTS

DE 8305713 U1 12/1985
DE 19704564 A1 8/1998
(Continued)

*Primary Examiner* — Katherine Zalasky McDonald
(74) *Attorney, Agent, or Firm* — Potomac Law Group, PLLC; George Dolina (57) ABSTRACT

A fluid purification system has cells whose purifying capability can be regenerated. Some of the cells are arranged in series to reach a high level of purification. An automatic valve network is controlled to cycle the cells in a way that levels the loads on each, thereby maximizing the service interval for replacing expired cells, enabling all of the cells to be replaced at the same time after having each contributing approximately equally to the purification load, and operated such that at any one time, at least one cell is regenerated so as to enable continuous up-time.

20 Claims, 5 Drawing Sheets

Related U.S. Application Data continuation of application No. 15/187,689, filed on Jun. 20, 2016, now Pat. No. 10,189,727, which is a continuation of application No. 13/713,767, filed on Dec. 13, 2012, now abandoned.

(60) Provisional application No. 61/570,108, filed on Dec. 13, 2011.

(51) Int. Cl.
  *B01D 61/54* (2006.01)
  *C02F 1/00* (2006.01)
  *B01D 65/02* (2006.01)
  *B01D 61/52* (2006.01)
  *C02F 1/44* (2006.01)
  *C02F 1/32* (2006.01)

(52) U.S. Cl.
  CPC ............... *C02F 1/008* (2013.01); *C02F 1/32* (2013.01); *C02F 1/441* (2013.01); *C02F 1/444* (2013.01); *B01D 61/52* (2013.01); *B01D 65/02* (2013.01); *B01D 2317/02* (2013.01); *B01D 2321/04* (2013.01); *B01D 2321/12* (2013.01); *C02F 2201/4613* (2013.01); *C02F 2201/46115* (2013.01); *C02F 2201/46145* (2013.01); *C02F 2209/003* (2013.01); *C02F 2209/005* (2013.01); *C02F 2209/40* (2013.01); *C02F 2301/08* (2013.01); *C02F 2303/16* (2013.01); *Y10T 137/8593* (2015.04)

(58) Field of Classification Search
  CPC ............... C02F 1/4695; C02F 2209/00; C02F 2209/001; C02F 2209/003; C02F 2209/005; C02F 2209/006; C02F 2209/10; C02F 2209/44; C02F 2301/04; C02F 2301/043; C02F 2301/08; C02F 2203/006; C02F 2201/46; C02F 2201/007; C02F 2201/004; C02F 2201/006; B01J 47/02; B01J 47/06; B01J 47/14
  See application file for complete search history.

(56) References Cited

U.S. PATENT DOCUMENTS

| | | |
|---|---|---|
| 2,995,334 A | 8/1961 | Henderson et al. |
| 3,034,085 A | 5/1962 | Pauler et al. |
| 3,100,486 A | 8/1963 | Nehring |
| 3,103,335 A | 9/1963 | Martinez |
| 3,252,124 A | 5/1966 | Roger |
| 3,579,441 A | 5/1971 | Brown |
| 3,709,365 A | 1/1973 | Czaplinski et al. |
| 3,786,810 A | 1/1974 | Pannier et al. |
| 3,926,797 A | 12/1975 | Gigou et al. |
| 4,059,512 A | 11/1977 | Harris |
| 4,144,884 A | 3/1979 | Tersteegen et al. |
| 4,202,332 A | 5/1980 | Tersteegen et al. |
| 4,246,101 A | 1/1981 | Selby |
| 4,361,485 A | 11/1982 | Boonstra |
| 4,370,983 A | 2/1983 | Lichtenstein |
| 4,432,765 A | 2/1984 | Oscarsson |
| 4,495,067 A | 1/1985 | Klein et al. |
| 4,564,132 A | 1/1986 | Lloyd-Davies |
| 4,596,550 A | 6/1986 | Troutner |
| 4,623,450 A | 11/1986 | Vantard et al. |
| 4,626,240 A | 12/1986 | Edelman et al. |
| 4,643,389 A | 2/1987 | Elson et al. |
| 4,661,246 A | 4/1987 | Ash |
| 4,698,153 A | 10/1987 | Matsuzaki et al. |
| 4,711,715 A | 12/1987 | Polaschegg |
| 4,753,371 A | 6/1988 | Michielin et al. |
| 4,784,495 A | 11/1988 | Jonsson et al. |
| 4,804,474 A | 2/1989 | Blum |
| 4,810,388 A | 3/1989 | Trasen |
| 5,032,265 A | 7/1991 | Jha et al. |
| 5,079,236 A | 1/1992 | Drizen et al. |
| 5,102,399 A | 4/1992 | Chu |
| 5,139,483 A | 8/1992 | Ryan |
| 5,141,493 A | 8/1992 | Jacobsen et al. |
| 5,194,157 A | 3/1993 | Ghezzi et al. |
| 5,221,483 A | 6/1993 | Glenn et al. |
| 5,259,954 A | 11/1993 | Taylor |
| 5,308,333 A | 5/1994 | Skakoon |
| 5,352,364 A | 10/1994 | Kruger et al. |
| 5,368,555 A | 11/1994 | Sussman et al. |
| 5,423,768 A | 6/1995 | Folden et al. |
| 5,484,397 A | 1/1996 | Twardowski |
| 5,484,431 A | 1/1996 | Scharf et al. |
| 5,498,338 A | 3/1996 | Kruger et al. |
| 5,536,412 A | 7/1996 | Ash |
| 5,578,181 A | 11/1996 | Hirose et al. |
| 5,591,344 A | 1/1997 | Kenley et al. |
| 5,622,626 A | 4/1997 | Matkovich et al. |
| 5,645,734 A | 7/1997 | Kenley et al. |
| 5,662,642 A | 9/1997 | Isono et al. |
| 5,690,831 A | 11/1997 | Kenley et al. |
| 5,702,597 A | 12/1997 | Chevallet et al. |
| 5,707,038 A | 1/1998 | Cocatre-Zilgien |
| 5,725,776 A | 3/1998 | Kenley et al. |
| 5,779,905 A | 7/1998 | Morandi et al. |
| 5,782,762 A | 7/1998 | Vining |
| 5,783,072 A | 7/1998 | Kenley et al. |
| 5,910,252 A | 6/1999 | Truitt et al. |
| 5,919,357 A | 7/1999 | Wilkins et al. |
| 5,951,859 A | 9/1999 | Miura et al. |
| 5,951,863 A | 9/1999 | Kruger et al. |
| 5,972,225 A | 10/1999 | Karras et al. |
| 6,017,433 A | 1/2000 | Mani |
| 6,039,877 A | 3/2000 | Chevallet et al. |
| 6,044,691 A | 4/2000 | Kenley et al. |
| 6,083,670 A | 7/2000 | Sugawara et al. |
| 6,106,723 A | 8/2000 | Grandics et al. |
| 6,132,616 A | 10/2000 | Twardowski et al. |
| 6,136,201 A | 10/2000 | Shah et al. |
| 6,146,536 A | 11/2000 | Twardowski |
| 6,187,207 B1 | 2/2001 | Brauer |
| 6,200,466 B1 | 3/2001 | Bender |
| 6,254,567 B1 | 7/2001 | Treu et al. |
| 6,284,142 B1 | 9/2001 | Muller |
| 6,287,516 B1 | 9/2001 | Matson et al. |
| 6,331,252 B1 | 12/2001 | Sayyid et al. |
| 6,428,518 B1 | 8/2002 | Brengle et al. |
| 6,475,385 B1 | 11/2002 | Boyce et al. |
| 6,485,649 B1 | 11/2002 | Terava et al. |
| 6,492,320 B2 | 12/2002 | Guo et al. |
| 6,561,997 B1 | 5/2003 | Weitzel et al. |
| 6,572,576 B2 | 6/2003 | Brugger et al. |
| 6,579,253 B1 | 6/2003 | Burbank et al. |
| 6,582,385 B2 | 6/2003 | Burbank et al. |
| 6,589,482 B1 | 7/2003 | Burbank et al. |
| 6,595,943 B1 | 7/2003 | Burbank |
| 6,607,697 B1 | 8/2003 | Müller |
| 6,626,857 B1 | 9/2003 | Ohta et al. |
| 6,638,477 B1 | 10/2003 | Treu et al. |
| 6,638,478 B1 | 10/2003 | Treu et al. |
| 6,649,063 B2 | 11/2003 | Brugger et al. |
| 6,656,423 B1 | 12/2003 | Joslyn |
| 6,679,988 B2 | 1/2004 | Gsell |
| 6,691,058 B2 | 2/2004 | Blakley |
| 6,726,914 B2 | 4/2004 | Aoki |
| 6,730,266 B2 | 5/2004 | Matson et al. |
| 6,743,193 B2 | 6/2004 | Brugger et al. |
| 6,745,903 B2 | 6/2004 | Grandics |
| 6,814,724 B2 | 11/2004 | Taylor |
| 6,818,133 B1 | 11/2004 | Wolter et al. |
| 6,830,553 B1 | 12/2004 | Burbank et al. |
| 6,852,090 B2 | 2/2005 | Burbank et al. |
| 6,855,122 B1 | 2/2005 | Ohta et al. |
| 6,908,546 B2 | 6/2005 | Smith |
| 6,942,634 B2 | 9/2005 | Odland |

(56) References Cited

U.S. PATENT DOCUMENTS

| | | |
|---|---|---|
| 6,955,655 B2 | 10/2005 | Burbank et al. |
| 6,962,575 B2 | 11/2005 | Tal |
| 6,982,038 B2 | 1/2006 | Dolecek et al. |
| 7,059,206 B1 | 6/2006 | Kingston et al. |
| 7,108,790 B2 | 9/2006 | Collins et al. |
| 7,214,312 B2 | 5/2007 | Brugger et al. |
| 7,226,538 B2 | 6/2007 | Brugger et al. |
| 7,314,569 B2 | 1/2008 | C. et al. |
| 7,322,969 B2 | 1/2008 | Hattori et al. |
| 7,353,634 B2 | 4/2008 | Grott |
| 7,410,473 B2 | 8/2008 | Levin et al. |
| 7,419,597 B2 | 9/2008 | Brugger et al. |
| 7,473,238 B2 | 1/2009 | Brugger et al. |
| 7,544,300 B2 | 6/2009 | Brugger et al. |
| 7,622,044 B2 | 11/2009 | Grott |
| 7,718,065 B2 | 5/2010 | Jordan |
| 7,842,002 B2 | 11/2010 | Mantle |
| 7,875,183 B2 | 1/2011 | Bradwell et al. |
| 7,967,984 B2 | 6/2011 | Midorikawa et al. |
| 8,070,707 B2 | 12/2011 | Gelfand et al. |
| 8,092,684 B2 | 1/2012 | Leonard et al. |
| 8,142,633 B2 | 3/2012 | Batchelder et al. |
| 8,147,696 B1 | 4/2012 | Pandya |
| 8,281,937 B2 | 10/2012 | Collins et al. |
| 8,366,883 B2 | 2/2013 | Bednarek et al. |
| 8,501,009 B2 | 8/2013 | Peterson et al. |
| 8,524,086 B2 | 9/2013 | Peterson et al. |
| 8,535,525 B2 | 9/2013 | Heyes et al. |
| 8,603,021 B2 | 12/2013 | Levin et al. |
| 8,685,251 B2 | 4/2014 | Smejtek et al. |
| 2001/0016699 A1 | 8/2001 | Burbank et al. |
| 2001/0021817 A1 | 9/2001 | Brugger et al. |
| 2001/0037079 A1 | 11/2001 | Burbank et al. |
| 2001/0039441 A1 | 11/2001 | Ash |
| 2001/0048909 A1 | 12/2001 | Taylor |
| 2002/0084188 A1 | 7/2002 | Tran et al. |
| 2002/0085952 A1 | 7/2002 | Ellingboe et al. |
| 2002/0104800 A1 | 8/2002 | Collins et al. |
| 2002/0120227 A1 | 8/2002 | Childers et al. |
| 2002/0121471 A1 | 9/2002 | Pedrazzi |
| 2002/0167322 A1 | 11/2002 | He et al. |
| 2002/0190000 A1 | 12/2002 | Baurmeister |
| 2003/0010701 A1 | 1/2003 | Collins et al. |
| 2003/0010717 A1 | 1/2003 | Brugger et al. |
| 2003/0010719 A1 | 1/2003 | Brugger et al. |
| 2003/0042201 A1 | 3/2003 | Sizelove et al. |
| 2003/0051767 A1 | 3/2003 | Coccaro et al. |
| 2003/0080140 A1 | 5/2003 | Neas et al. |
| 2003/0105435 A1 | 6/2003 | Taylor |
| 2003/0130606 A1 | 7/2003 | Tuck |
| 2003/0148017 A1 | 8/2003 | Tuominen et al. |
| 2003/0168389 A1 | 9/2003 | Astle et al. |
| 2003/0173297 A1 | 9/2003 | Grandics |
| 2003/0236481 A1 | 12/2003 | Burbank |
| 2004/0045881 A1 | 3/2004 | Collins et al. |
| 2004/0060866 A1 | 4/2004 | Radunsky et al. |
| 2004/0068219 A1 | 4/2004 | Summerton et al. |
| 2004/0069709 A1 | 4/2004 | Brugger et al. |
| 2004/0089594 A1 | 5/2004 | Collins et al. |
| 2004/0186415 A1 | 9/2004 | Burbank et al. |
| 2004/0217057 A1 | 11/2004 | Rovatti |
| 2004/0221643 A1 | 11/2004 | Ehwald et al. |
| 2004/0222139 A1 | 11/2004 | Brugger et al. |
| 2004/0232079 A1 | 11/2004 | Taylor et al. |
| 2005/0029192 A1 | 2/2005 | Arnold et al. |
| 2005/0045548 A1 | 3/2005 | Brugger et al. |
| 2005/0061743 A1 | 3/2005 | Buttner |
| 2005/0067341 A1 | 3/2005 | Green et al. |
| 2005/0103622 A1 | 5/2005 | Jha et al. |
| 2005/0103717 A1 | 5/2005 | Jha et al. |
| 2005/0171501 A1 | 8/2005 | Kelly |
| 2005/0209547 A1 | 9/2005 | Burbank et al. |
| 2005/0215975 A1 | 9/2005 | Mathias et al. |
| 2005/0242032 A1 | 11/2005 | Sugito et al. |
| 2006/0021944 A1 | 2/2006 | Carson et al. |
| 2006/0231495 A1 | 10/2006 | Freydina et al. |
| 2007/0007208 A1 | 1/2007 | Brugger et al. |
| 2007/0038191 A1 | 2/2007 | Burbank et al. |
| 2007/0158267 A1 | 7/2007 | Micheli |
| 2007/0179422 A1 | 8/2007 | Schnell et al. |
| 2007/0215474 A1 | 9/2007 | Batchelder et al. |
| 2007/0248489 A1 | 10/2007 | Taylor et al. |
| 2007/0260168 A1 | 11/2007 | Brugger et al. |
| 2008/0053905 A9 | 3/2008 | Brugger et al. |
| 2008/0173574 A1 | 7/2008 | Silveri |
| 2008/0185294 A1 | 8/2008 | Cai et al. |
| 2008/0203023 A1 | 8/2008 | Burbank et al. |
| 2008/0210606 A1 | 9/2008 | Burbank |
| 2008/0221218 A1 | 9/2008 | Nelissen et al. |
| 2008/0223795 A1 | 9/2008 | Bakajin et al. |
| 2008/0230450 A1 | 9/2008 | Burbank et al. |
| 2009/0127194 A1 | 5/2009 | Joo |
| 2010/0004590 A1 | 1/2010 | Hedmann et al. |
| 2010/0051544 A1 | 3/2010 | Berg et al. |
| 2010/0051546 A1 | 3/2010 | Vuong et al. |
| 2010/0191377 A1 | 7/2010 | Smith et al. |
| 2010/0204765 A1 | 8/2010 | Hall et al. |
| 2011/0186521 A1 | 8/2011 | Burbank et al. |
| 2011/0315632 A1 | 12/2011 | Freije et al. |
| 2012/0006670 A1 | 1/2012 | Kamen et al. |
| 2012/0261315 A1 | 10/2012 | Collins et al. |
| 2013/0126430 A1 | 5/2013 | Kenley et al. |
| 2013/0206574 A1 | 8/2013 | Kamen et al. |

FOREIGN PATENT DOCUMENTS

| | | |
|---|---|---|
| EP | 1891999 A1 | 2/2008 |
| EP | 2221102 A1 | 8/2010 |
| EP | 2505559 A1 | 10/2012 |
| EP | 2514723 A1 | 10/2012 |
| GB | 2135598 A | 9/1984 |
| JP | 2003175101 A | 6/2003 |
| JP | 2004000583 A | 1/2004 |
| WO | 1996036370 A1 | 11/1996 |
| WO | 1996037440 A1 | 11/1996 |
| WO | 1999056696 A1 | 11/1999 |
| WO | 2002032476 A2 | 4/2002 |
| WO | 2002095675 A1 | 11/2002 |
| WO | 2003006100 A1 | 1/2003 |
| WO | 2003006139 A1 | 1/2003 |
| WO | 2003103533 A2 | 12/2003 |
| WO | 2004062710 A2 | 7/2004 |
| WO | 2004066121 A2 | 8/2004 |
| WO | 2004080282 A2 | 9/2004 |
| WO | 2004084972 A2 | 10/2004 |
| WO | 2005068043 A1 | 7/2005 |
| WO | 2005092397 A1 | 10/2005 |
| WO | 2006074429 A1 | 7/2006 |
| WO | 2007118235 A2 | 10/2007 |
| WO | 2008156795 A1 | 12/2008 |
| WO | 2009112816 A1 | 9/2009 |

FLUID PURIFICATION METHODS, DEVICES, AND SYSTEMS

CROSS REFERENCE TO RELATED APPLICATIONS

This application is a continuation of U.S. patent application Ser. No. 15/214,438, filed Jul. 19, 2016, which is a continuation of U.S. patent application Ser. No. 15/187,689 filed Jun. 20, 2016, which is a continuation application of U.S. patent application Ser. No. 13/713,767 filed Dec. 13, 2012, which claims the benefit of U.S. Provisional Application No. 61/570,108 filed Dec. 13, 2011, all of which are hereby incorporated by reference in their entirety herein.

BACKGROUND

Electronic deionization (EDI) is an established method for purification of water by removing ionic solutes. EDI uses filter units, hereafter referred to as cells, which have a membrane. EDI uses electricity in addition to a membrane to filter material including solutes. The membranes of cells can be regenerated electrically and by reverse flushing and are therefore regarded as re-usable. The number of regeneration cycles of cell may be limited because of gradual permanent degradation of the membrane of the cell.

Ionic solutes may be expressed as total dissolved solids (TDS) in parts per million (PPM). As indicated above, an EDI cell may be capable of 85% to 95% TDS reduction. Higher levels of purification can be achieved with three or more EDI cells connected in series to achieve a ratio of TDS in the input water to that in the output water as shown in the table below. For example, water containing 1000 ppm TDS may have the TDS reduced at each stage of a series-connected cells as follows.

| 1000 TDS × 90% Stage 1 = | 900 TDS Reduction\|out = 100 ppm |
| 100 TDS × 90% Stage 2 = | 90 TDS Reduction\|out = 10 ppm |
| 10 TDS × 90% Stage 3 = | 9 TDS Reduction\|out = 1 ppm |

1.0 ppm remaining from 1000 TDS starting concentration

When an EDI cell is actively removing ions, membranes of the cell are charged with electricity creating anionic and cationic bonding sites. EDI cells require regeneration after a period of time. During regeneration, the polarity on the membranes is reversed and water forced in a reverse direction to push the ions out of the bonding sites and flush the captured ions out of the cell.

In EDI technology, a membrane, such as a re-usable membrane, has a finite service life. In general, the service life is a function of the number of regeneration cycles. During regeneration, the membrane is exposed to concentrated solutes. Progressive scaling of calcium carbonate and other solutes can occur during the regeneration cycle. As scale forms, the membrane becomes permanently degraded, ultimately requiring replacement.

SUMMARY

Embodiments of the disclosed subject matter relate to fluid purification methods, devices, and systems. In particular, embodiments of the disclosed subject matter involve multi-cell and multi-stage batch electronic deionization systems, methods, and devices.

Figure 1:
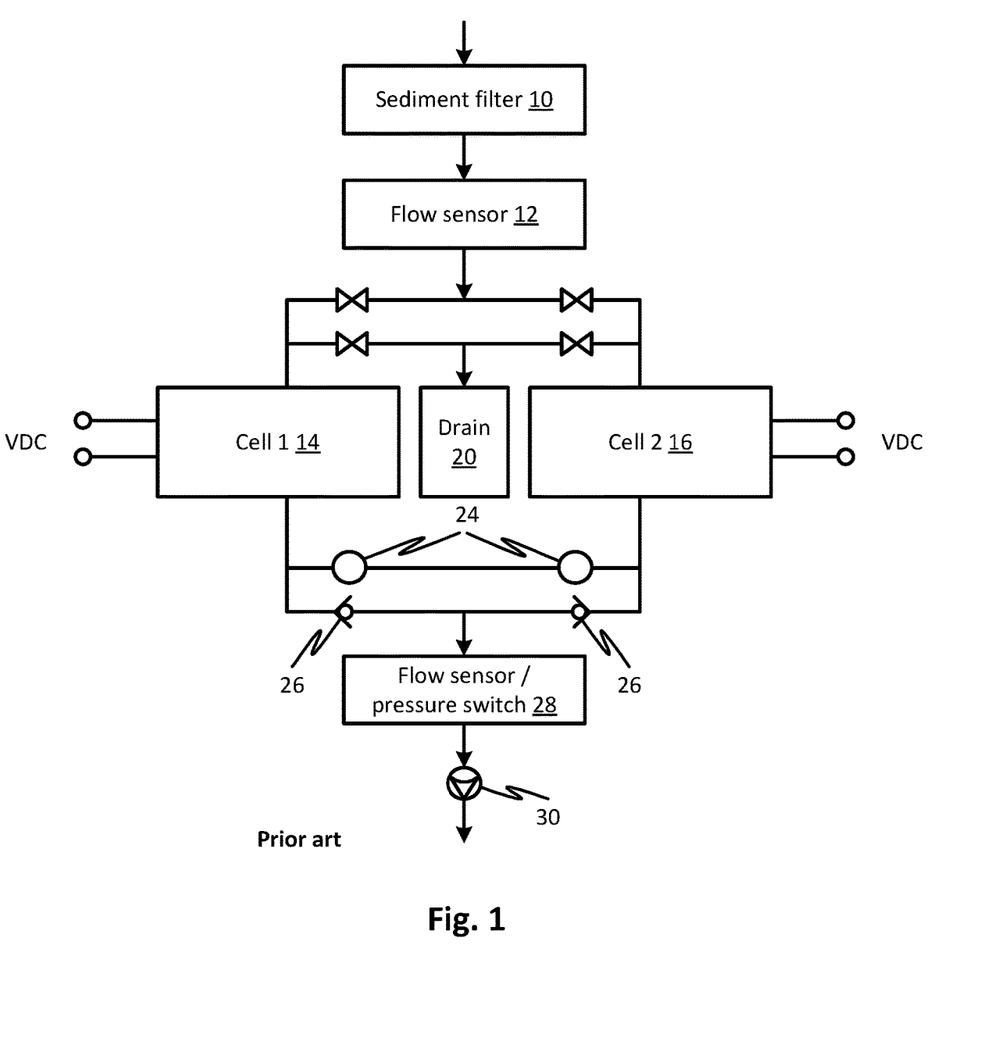
FIG. 1 is a block diagram of a two-cell electronic deionization system according to the prior art.

Embodiments include multiple cell, multi-stage purification systems, for example a four-cell, three-stage EDI system is described. In the disclosed embodiments, a predetermined purity is achieved while also optimizing a service interval between the replacements of one or more permanently degraded cells resulting from the system use, including multiple regeneration cycles of the cells in each stage. The disclosed subject matter may be adapted to achieve, for example, 99.9% total dissolved solids (TDS) reduction versus only 85% to 95% TDS reduction in a single stage system in which fluid flows through a single stage. FIG. 1 shows an example of a two-cell system according to the prior art in which valves 26 are operated to produce a reverse flow in cell 1 14 to regenerate it while cell 2 16 receives a forward flow to purify the flowing water. Flushed reversed flow is drained through a drain. The flow restrictors 24 and check valves 26 cooperate with the valves to divert some of the purified water to the cell undergoing regeneration by reverse flow. A flow sensor and pressure switch 28 are provided. In addition to higher purity, a four-cell, three-stage, system or device can provide a much higher service life than a conventional two-cell single stage system.

Embodiments include a three-stage system or device comprised or consisting of three paired cells in fixed position. Such a system or device can also achieve about 99.9% TDS reduction.

Objects and advantages of embodiments of the disclosed subject matter will become apparent from the following description when considered in conjunction with the accompanying drawings.

BRIEF DESCRIPTION OF THE DRAWINGS

Embodiments will hereinafter be described in detail below with reference to the accompanying drawings, wherein like reference numerals represent like elements. The accompanying drawings have not necessarily been drawn to scale. Where applicable, some features may not be illustrated to assist in the description of underlying features.

DESCRIPTION OF EMBODIMENTS

As used in the description, the term cell may refer to any kind of fluid purification element. Although specific examples are described which employ EDI cells in the context of water purification, it should be understood that the term cell may refer to one or more units that produce a reduction in filterable content of a fluid stream. In the case of EDI embodiments, the cells reduce ionic species as well particulates. Preferably, particulates are substantially removed from the fluid stream prior to passing through an EDI purification system.

Figure 2:
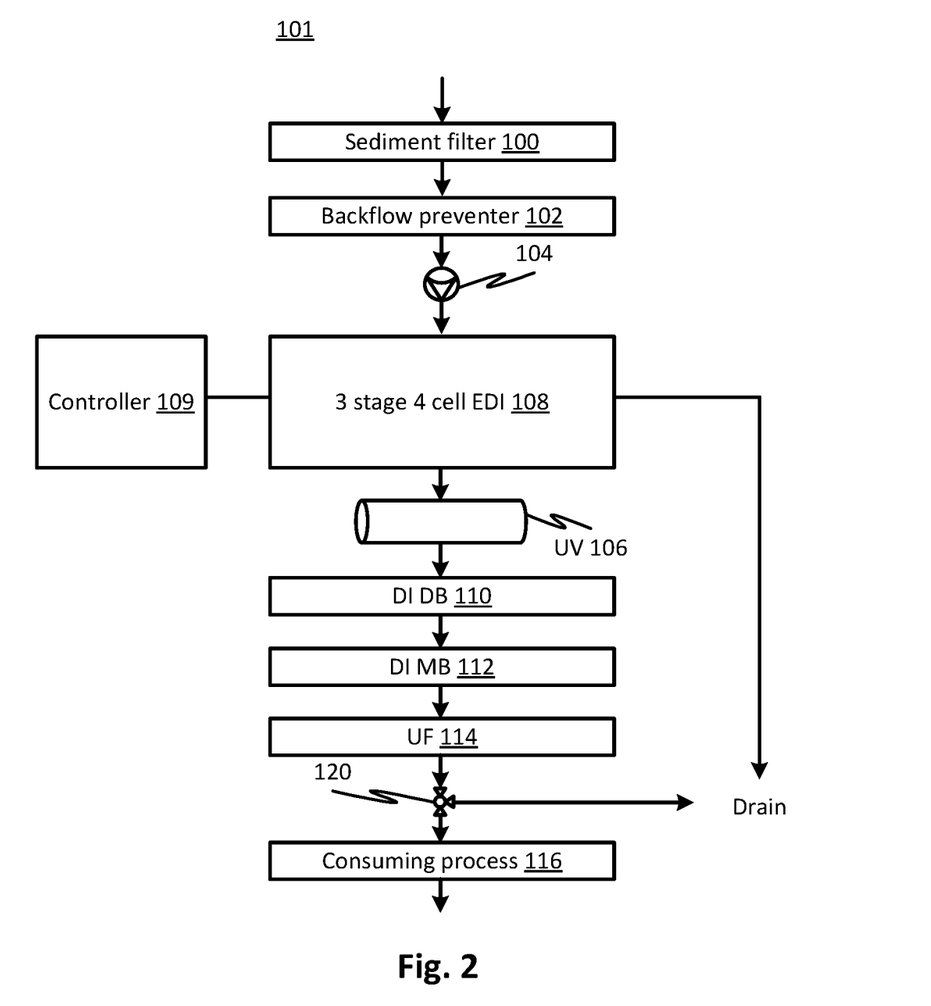
FIG. 2 is a block diagram of a fluid purification system according to embodiments of the disclosed subject matter.

Embodiments described hereinbelow include multi-stage, multi-cell systems. In this case, each stage of an N-stage system may include one or more cells and the one or more cells will be arranged so that a first stage purifies fluid and outputs purified fluid to a second stage attached to it in a series relationship so that it can further purify the fluid. The series continues until the fluid is purified by an Nth stage. Fluid may also flow through cell modules that are arranged within a cell in a parallel relationship in each stage. To simplify discussion, such a stage, having multiple cell modules or filter units in which a flow is divided to flow through separate units, will still be called a "cell" herein. In a multi-stage system, the first cell in a series (that is, the first stage, which is receiving fluid from the source to be treated and not from an upstream cell stage) has the greatest filtering load. In embodiments, the first cell in the series is always the next cell to be regenerated. In further embodiments, multiple cells awaiting regeneration may stand by and be regenerated in parallel. The second cell in the series has a lighter load because the fluid it receives has a lower amount of material to remove. The third cell will have even less filtering load and so on for as many cells as are in the series. FIG. 2 is a block diagram of a fluid purification system 101 according to embodiments of the disclosed subject matter. The system 101 may be, for example, a water purification plant that generates pure water used for medical treatment, for example, dialysate used in renal replacement therapy. The downstream consuming process 116, in such a case, may represent a process that stores pure water to be used later in the preparation of treatment fluids or a proportioning system that adds specific materials such as solutes for preparing treatment fluids such as dialysate. Water from a source may be filtered initially by a sediment filter 100 and then pass through a backflow preventer 102. A pump 104 may be included but the system may also operate on source water line pressure, if sufficient. The fluid (advantageously, water) from the pump or backflow preventer 104, 102 may be applied to an EDI purification system 108, in the present case identified as a 3-stage, 4 cell EDI system powered and controlled by a controller 109. The fluid treated by the EDI system 108 may be further treated by a UV treatment cell 106 which may provide degradation of some chemicals or bio-contaminants. A chemical deionization stage including a dual bed 110 and mixed bed 112 stage may further deionize the fluid (again, the system in the principal embodiment is directed to water, so the deionization would be used to deionize water). An ultrafiltration stage 114 may be provided for, as in a principal environment, to capture pyrogens and/or infectious particles. The latter is particularly useful for medical applications where the product fluid is used for medical purposes and thereby may come in contact with a patient's body. As indicated above, the consuming process 116 may be any of a variety of consuming processes. A drain may receive fluid from a valve 120 that diverts product fluid from the upstream stages to the drain during transient cycles or for testing during startup before a steady state product fluid production cycle begins. As will be explained further on, the EDI system 108 also produces waste water during regeneration of the cells. Note that the EDI system 108 may be replaced with any type of multi-stage multiple element filtration or purification system, where cells other than EDI type cells, whose purification capability can be regenerated, may be used.

FIGS. 3A-3D shows stages of a four-cell, three-stage EDI system or device according to embodiments of the disclosed subject matter. The system shown in FIG. 2 can include the four-cell, three-stage electronic deionization system, for example at 108 as indicated. The EDI system of FIGS. 3A-3D may be used in other systems as well or as a stand-alone deionization system. The system of FIGS. 3A-3D may also be used with non-EDI purification cells that are regenerated using reverse flow or by other means.

Embodiments of the disclosed subject matter can include a three-stage electronic deionization system. Optionally, the system or device can include four cells. Other embodiments based on a different number of cells are also possible, for example, a two-stage system or four or more stages in a system. In addition, as mentioned, a single cell may include more than one purification unit connected in parallel or series.

Each of the cells 340, 342, 344, and 346 can be connected and controlled to operate for fluid purification or regeneration. For fluid purification, fluid flows in a forward direction to produce product fluid; in an embodiment, water flows to produce product water. In the case of an EDI cell, a forward voltage is applied. To operate for regeneration, the fluid flows in a reverse direction through the cell and, in the case of an EDI cell, a reverse voltage is applied to the cell undergoing regeneration. A controller may apply the voltage and control valves to subject a selected cell to the regeneration and purification modes automatically and for predefined volumes of fluid or time intervals. In addition, the regeneration modes may be triggered my measured levels of contamination in the product fluid. For example, the ion concentration of product, in water purification embodiments, may be measured using a resistivity sensor and the signal used by the controller to control valves and voltages for the mode establishment as discussed. In the following discussion, it is assumed the fluid is water, but other fluids may be used and the cells configured for the purification of other types of fluids, correspondingly.

Figure 3A:
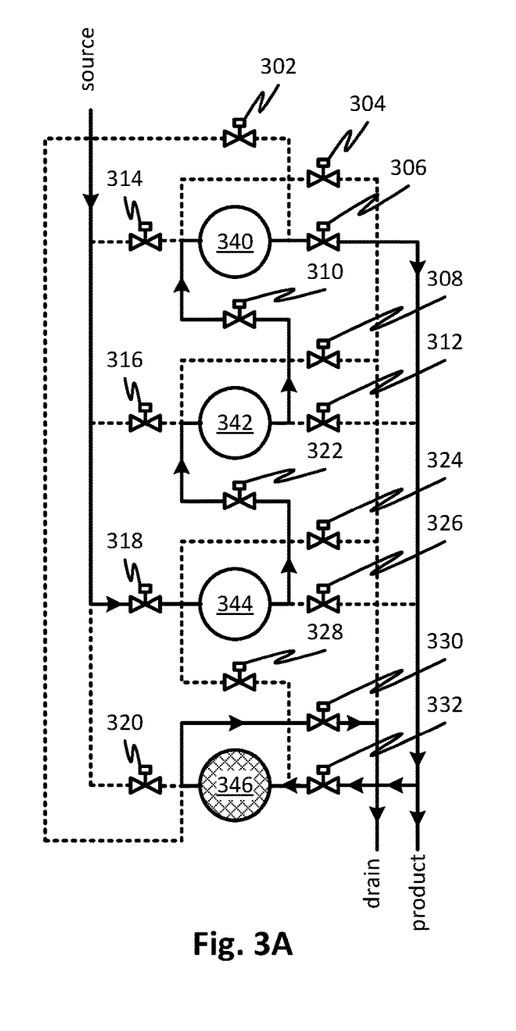
FIGS. 3A-3D shows regeneration cycles of respective stages of a four-cell, three-stage electronic deionization system or device according to embodiments of the disclosed subject matter.

The four cells can be inter-connected by tubing and valves, for example, as shown in FIGS. 3A-3D. Each cell is shown at 340, 342, 344, and 346. The number of cells may vary in alternative embodiments. At any given time, three of the cells 340, 342, 344, and 346 are connected in series for continuous production of product water. For example, in FIG. 3A, the cell 346 is undergoing regeneration and cells 340, 342, and 344 are connected in series to produce product water. Part of the product water output from the final cell in the series, cell 340, is diverted to reverse flush cell 346 and the resulting waste stream flowed to a drain. To accomplish the simultaneous production and regeneration, control valves are set such that valves 302, 320, 316, 314, 304, 308, 312, 324, 328, and 326 are closed while valves 330, 332, 310, 322, 306, and 318 are open. In FIG. 3A, the dotted lines indicate lines where no flow occurs and the solid lines and arrows indicate that flow is occurring and the direction of the flow in the indicated lines. It can be seen by the arrangement of the flow paths that the identified regenerating and product water flows result as indicated by the solid and dotted lines.

Figure 3B:
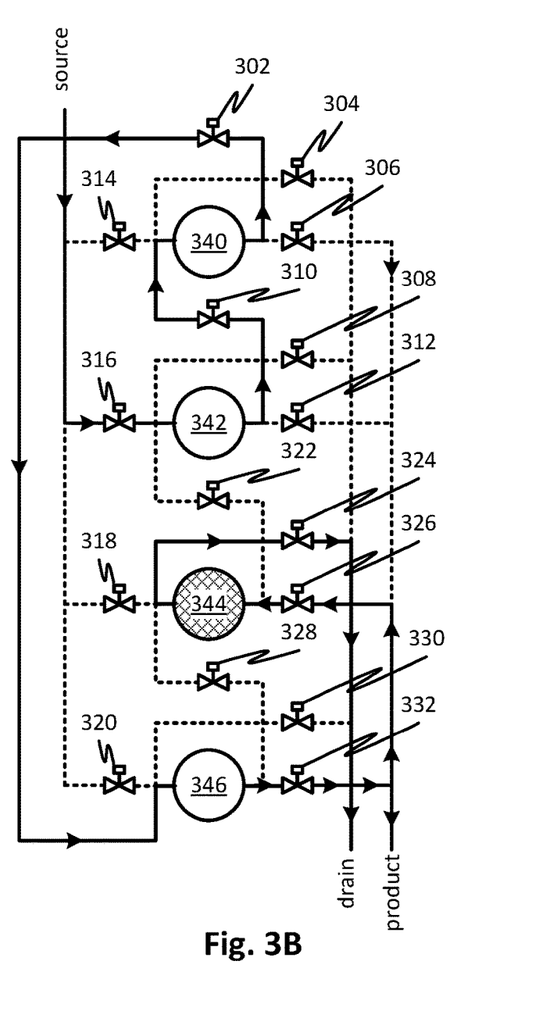

In FIG. 3B, the cell 340 is undergoing regeneration and cells 340, 342, and 346 are connected in series to produce product water. Part of the product water output from the final cell in the series, cell 346, is diverted to reverse flush cell 344 and the resulting waste stream flowed to a drain. To accomplish the simultaneous production and regeneration, control valves are set such that valves 304, 314, 306, 308, 312, 322, 330, 320, 328, and 318 are closed while valves 302, 310, 332, 324, 326, and 316 are open. In FIG. 3B, the dotted lines indicate lines where no flow occurs and the solid lines and arrows indicate that flow is occurring and the direction of the flow in the indicated lines. It can be seen by the arrangement of the flow paths that the identified regenerating and product water flows result as indicated by the solid and dotted lines.

Figure 3C:
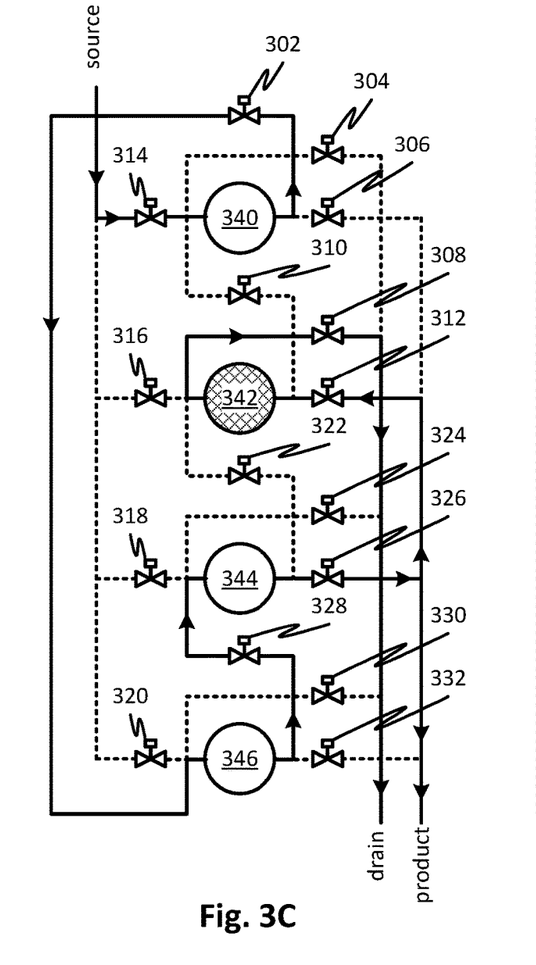

In FIG. 3C, the cell 342 is undergoing regeneration and cells 340, 344, and 346 are connected in series to produce product water. Part of the product water output from the final cell in the series, cell 344, is diverted to reverse flush cell 342 and the resulting waste stream flowed to a drain. To accomplish the simultaneous production and regeneration, control valves are set such that valves 304, 306, 310, 316, 322, 324, 318, 330, 320, and 332 are closed while valves 314, 302, 308, 312, 326, and 328 are open. In FIG. 3C, the dotted lines indicate lines where no flow occurs and the solid lines and arrows indicate that flow is occurring and the direction of the flow in the indicated lines. It can be seen by the arrangement of the flow paths that the identified regenerating and product water flows result as indicated by the solid and dotted lines.

Figure 3D:
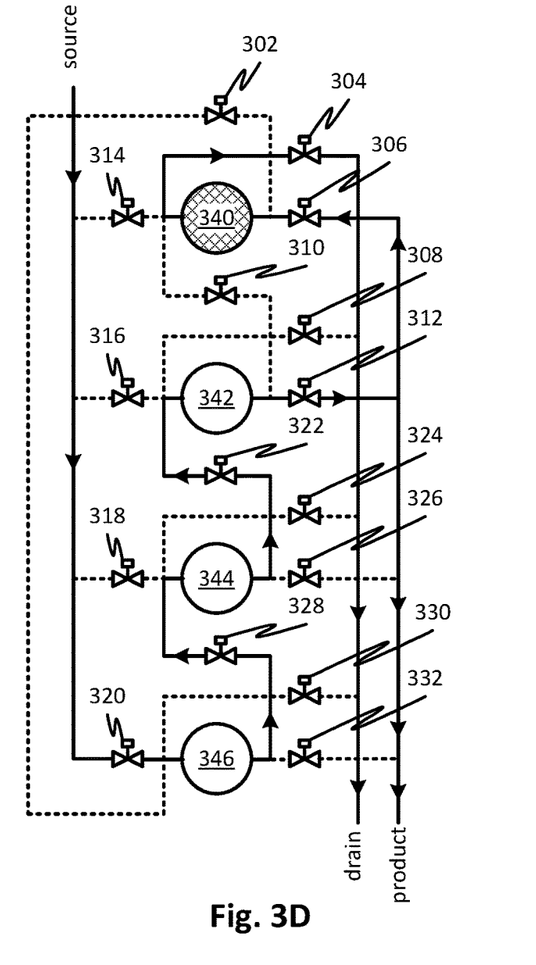

In FIG. 3D, the cell 340 is undergoing regeneration and cells 342, 344, and 346 are connected in series to produce product water. Part of the product water output from the final cell in the series, cell 342, is diverted to reverse flush cell 340 and the resulting waste stream flowed to a drain. To accomplish the simultaneous production and regeneration, control valves are set such that valves 302, 310, 314, 318, 316, 308, 326, 324, 330, and 332 are closed while valves 304, 306, 312, 320, 322, and 328 are open. In FIG. 3D, the dotted lines indicate lines where no flow occurs and the solid lines and arrows indicate that flow is occurring and the direction of the flow in the indicated lines. It can be seen by the arrangement of the flow paths that the identified regenerating and product water flows result as indicated by the solid and dotted lines.

Figure 4:
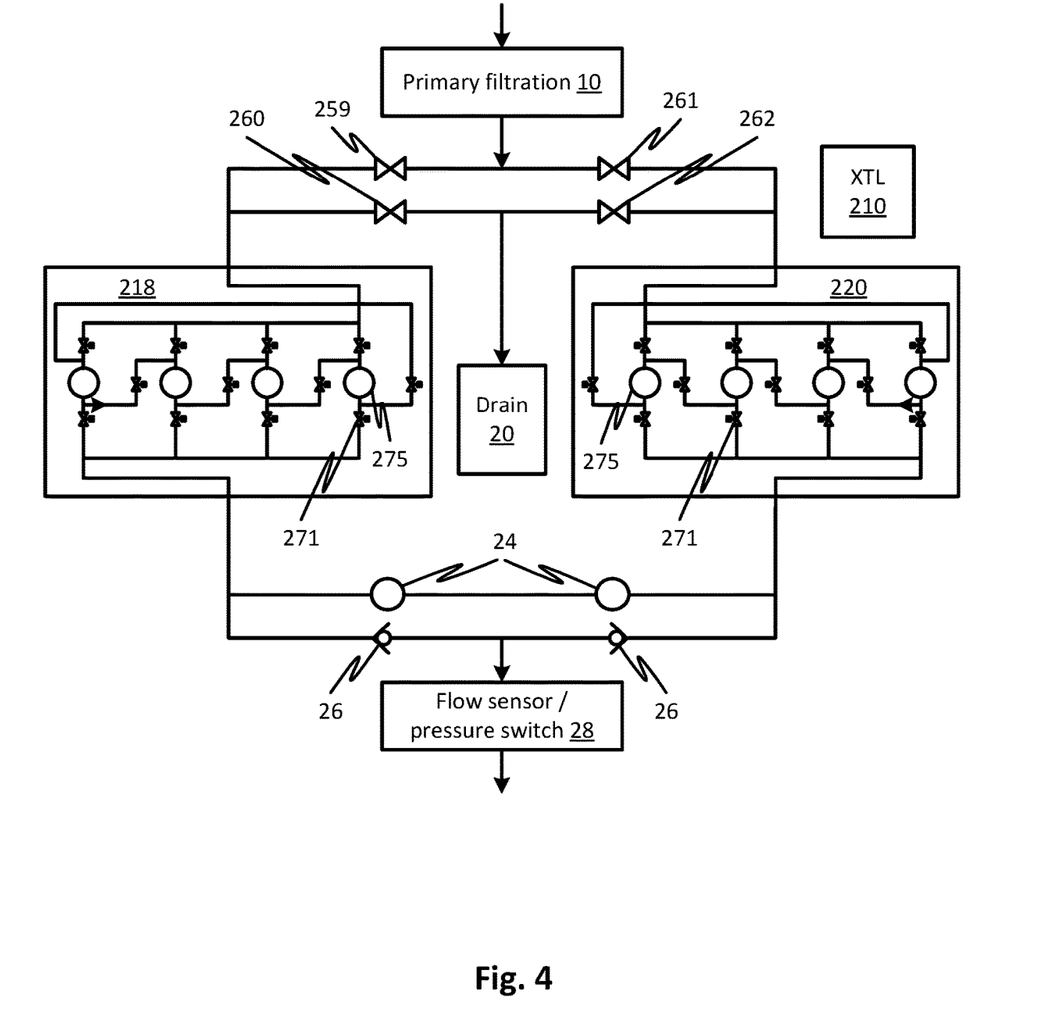
FIG. 4 shows another embodiment in which a cell to be regenerated in a cell of a multi-stage purifier is regenerated while a parallel multi-stage purifier purifies fluid and then the multi-stage purifiers switch for regeneration of the next cell to be regenerated.

To illustrate that a variety of arrangements of a fluid management system (the valve network embodiments being a fluid management systems), an alternative arrangement regenerates one member of a series while the other members of the series wait. To allow continuous purification, a second series operates while the one is regenerated. By providing a suitable fluid management system (or valve network) all of the cells in each series can be suitably arranged in the series so that the most recently regenerated cell is last in the series (so product water comes out of it) and the cell that has been used for the longest time or volume of fluid since regeneration is first in the series. FIG. 4 shows such a system where two multi-stage purifiers 218 and 220 each has a 4-stage 4-cell series. In FIG. 4 a cell to be regenerated (for example one in side 218) is regenerated while a parallel multi-stage purifier (for the example 220) purifies fluid and then the two multi-stage purifiers switch for regeneration of the next cell in the parallel multi-stage purifier is regenerated. The cells may be shifted in order so that the most recently regenerated cell is always last in the series by controlling the valves 271 by the controller 210. The valves 259 through 261 may be operated by controller 210 so that a forward flow goes only to one side at a time while a reverse flow through a respective flow restrictor 24 returns through one of the valves 260 or 262 to the drain 20 with the check valves blocking flow so as to ensure the correct open flow path. Although not labeled individually, each series has valves that may be operated by the controller 210 to provide the aforementioned serial arrangement of cells. It may be confirmed that the arrangement of FIG. 4 produces the desirable features of the other embodiments in which the purification load is distributed uniformly among the cells 275 of each multi-stage purifier 218 and 220. As a result, the cells may be replaced at less frequent intervals, after permanent exhaustion, and may be regenerated automatically. The foregoing embodiment of FIG. 4 may have sensors for detecting TDS reduction from source to product as in the foregoing embodiments. As in prior systems, flow sensors and pressure switch 28, backflow preventers, etc. may be provided.

Variations of the FIG. 4 embodiment are possible. For example each multi-stage purifier may have N cells and but N–M stages such that M stages are regenerated at a time and the cells ready for regeneration are switched out. For example, in a 4 cells system, three stages may be used in series and one stage left on standby to be switched into the circuit, and the first one to be regenerated switched out to await the next regeneration cycle which occurs when the second cell requiring regeneration is ready for regeneration. The valves 271 would be operated to regenerate both cells requiring regeneration in parallel (parallel flow).

The interconnection of cells, tubing, and valves can be controlled such that product water flows through any three cells in series at all times. A fourth cell can be controlled such that it is in a regeneration state or in an idle state. In embodiments, each cell may progress through the following sequence: regeneration→stage three→stage two→stage 1. Optionally, each cell may progress through the aforementioned sequence such that no two cells are at the same stage at the same time. Thus, embodiments can include four cells that are controllable so as to operate in a rotating series to support three states of deionization plus a regeneration state.

One advantage embodiments of the disclosed subject matter provide is increased membrane life. This can be achieved by embodiments of the disclosed subject matter by spreading out usage of the four membranes based on the aforementioned cell operational sequence. That is to say, relative to service life of the membrane, life optimization can be achieved by spreading the service life over four membranes instead of two in a two-cell system. Note that a single cell must have an adjacent cell to supply purified water during regeneration. Assume that a pair of cells can have a service life of 1.0 units of volume, for instance, for a two membrane system. This can limit the interval between membrane exchange to 1.0 units of volume. The combination of four cells has a total service life of approximately 1.95 units of volume, for instance, for a four membrane system. As an example, systems, devices and methods according to embodiments of the disclosed subject matter, for instance four membrane systems, can have a service interval between membrane exchange of 1.95 units of volume, or a 95% increase over two-cell systems.

The increased combined service life of the four membranes is possible because during stage two operation a membrane can be exhausted at $1/10^{th}$ the rate of a single stage system, and a membrane during stage three operation can be exhausted at $1/100^{th}$ the rate of a single stage system.

In any of the embodiments, water may be received at the source at pressure such that the water is conveyed through the valve system using the pressure from the source. Alternatively any of the embodiments may be provided with a pump to convey water. Note that any of the above systems may be modified by the inclusion of an arbitrary number of cells. Each or any cell in the embodiments may be replaced by one or more separate cells arranged in series or parallel. The cells may include any type of filtration or purification device that is capable of being regenerated. The cells may include a purification element such as one or more filter membranes, plates such as in an electrostatic precipitator, depth loading medium, inertial separator elements, or any other type of purification element(s). The cells are also permanently exhausted after being subjected to multiple regeneration cycles. In any of the embodiments, instead of purifying water, other fluids may be purified and used for processing including non-aqueous solvents, fuels, food products, cleaning fluids, etc.

In any of the embodiments disclosed, the regeneration cycle may be triggered by a measured reduction in TDS or a threshold level of purity in the product stream which may be measured by a suitable sensor, for example, turbidity, conductivity or resistivity, pH, particle counting, optical diffusion, density, thermal conductivity temperature, or other property. The regeneration cycle may also be triggered by a predictive algorithm such as a measured volume of purified fluid having passed through since the last cycle or a predetermined time. A controller may be suitably configured to implement any of these criteria according to known techniques.

In any of the disclosed embodiments, the valves and flow channels may take a variety of different forms depending on the capacity and type of fluid. Examples of configurations are shown, but a variety of different configurations are possible.

According to embodiments, the disclosed subject matter includes a water purification system in which multiple cells are interconnected by a valving network, wherein each of the cells includes at least one purification element, for example, a membrane or other type of contaminant separator. A controller is configured to control the valves of the valving network and a source of water is connected to the valving network to provide water to be purified. The water may also be used for regenerating cells so the valving network includes a drain. A product water outlet is also provided.

The controller is configured to, at a first time, generate a reverse flow of water through a first subset of the cells while simultaneously flowing water in a forward direction through two or more cells in a second subset, while connecting the two or more cells in the second in series. Thus the two or more cells of the series define a multiple stage purification component that provide purified water using a part of the valving network to conduct the water between the source and the product water outlet. The controller is further configured to direct a flow of water from the first subset of the cells to the drain while directing a flow from a last one of the two or more cells connected in series to a product water outlet. The cells in the first subset and the cells in the second subset are mutually exclusive, that is, the cell or cells being regenerated are not used, at the same time, for water purification, so the subsets are disjoint.

In variations of the previous embodiment, the controller may be further configured to, at a second time, generate a reverse flow of water through a third subset of the cells while simultaneously flowing water in a forward direction through two or more cells in a fourth subset, while connecting the two or more cells in the fourth subset in series.

The cells in the third subset and the cells in the fourth subset may be mutually exclusive and wherein the cells in the first set and the third set may be mutually exclusive.

In the variations of the previous embodiments, the reverse flow of water may be effective to regenerate the cells. The cells may be electronic deionization cells. In further variations, the controller may be configured to apply a reverse voltage to the cells in the first and third subsets at said first and second times, respectively. At the first time, the reverse flow of water may be water from last cell of the second subset in the series of cells which may be thereby purified water. At the second time, the reverse flow of water may be water from last cell of the fourth subset in the series of cells which may be thereby purified water. The second and fourth subsets may be interconnected in series such as to produce a 99.9% reduction in total dissolved solids in the water received from the source by the valve network.

According to embodiments, the disclosed subject matter includes a water purification system with multiple cells interconnected by a valving network, wherein each of the cells has a membrane. For example, the cells may be EDI cells. The controller of the present embodiment is configured to, at regeneration times that can be selected by the controller, select each of the cells in turn to be a currently selected cell to be regenerated and to regenerate it by causing a reverse flow of water therethrough while simultaneously controlling the valves of the valve network to flow water from the source in series through the cells other than the currently selected cell to form a series of cells, the series of cells having a first cell which receives the water from the source and a final cell which provides purified water to the product water outlet. The water that reverse flows through the cell being regenerated can come from the cells being used for purification. The controller is configured such that, at each of said regeneration times, said each cell may be selected after it has been the first cell in the series of cells at a prior respective time.

The valve network in this and all the embodiments can have connectors by which the cells can be removed and replaced with new ones as they expire after multiple purification and regeneration cycles. The above operations may be repeated may times until the cells expire. This may be done under control of the controller automatically.

The regeneration cycles may be triggered by time, or an event, for example, the cells may rotated and regenerated as described above whenever the reduction in TDS, for the full series of cells, (i.e., the reduction in TDS from the source water to the product water) falls below a predetermined level. The controller may also monitor how much purified water is produced and generate a display to replace the cells manually when, between points where the product water quality falls below the predetermined level, the amount of produced water falls below a predetermined volume.

The controller may be configured such that the final cell in the series, at a given regeneration time, may be the cell selected to be regenerated at the most recent previous regeneration time. Each of the cells in the series may be arranged in order of time since its last turn as the selected cell to be regenerated such that the most recently regenerated cell may be said final cell. The product water may be used in the reverse flow of water in any of the embodiments including the present one and the variations of it.

The series of cells may be selected and arranged in number and/or capacity, so that they are, collectively—in the series—effective to achieve a 99.9% reduction total dissolved solids. As mentioned, the cells can be, or include, electronic deionization (EDI) cells. The number of cells may be at least three in advantageous embodiments. The regeneration times may be selected by the controller responsively to a measurement of water quality at a point in said series. Each of the cells in the series may be arranged in order of time (or cumulative treated fluid volume) since its last turn as the selected cell to be regenerated such that the most recently regenerated cell may be said final cell.

To measure total fluid volume, for those embodiments in which the total cumulative volume is used for control, a flow meter may be used, for example, a rate meter or a displaced volume meter.

According to embodiments, the disclosed subject matter includes a fluid purification system with multiple cells interconnected by a valving network, wherein each of the cells has a purification element such as a filter membrane, an EDI membrane, a depth loading filter, an inertial separation filter, an electrostatic precipitator or some other kind of separation element (or a plurality thereof) that removes contaminants or other materials from a fluid stream. The controller is configured to, at regeneration times, select each of the cells in turn to be a currently selected cell to be regenerated and to regenerate it by causing a reverse flow of fluid therethrough while simultaneously controlling the valves of the valve network to flow fluid from the source in series through the cells other than the currently selected cell to form a series of cells, the series of cells having a first cell which receives the fluid from the source and a final cell which provides purified fluid to the product fluid outlet. The controller is configured such that, at each of said regeneration times, said each cell may be selected after it has been the first cell in the series of cells at a prior respective time.

In the embodiment of the last paragraph, the controller may be configured such that the final cell in the series, at a given regeneration time, may be the cell selected to be regenerated at the most recent previous regeneration time. Each of the cells in the series may be arranged in order of time since its last turn as the selected cell to be regenerated such that the most recently regenerated cell may be said final cell. Product fluid may be used in the reverse flow of fluid. The series of cells may be effective to achieve a 99.9% reduction total dissolved solids.

According to embodiments, the disclosed subject matter includes an installation for a fluid purification system that may be operable after the attachment of cells adapted for purifying fluid. This embodiment includes only the fluid handling circuit without the purification elements or cells. A fluid transport network has fluid channels, a controller, and valves are operable by the controller. The fluid transport network includes cell connectors adapted to receive cells adapted for purifying fluid and to direct forward and reverse flows through connected cells. The fluid transport network has connections for source fluid, purified product fluid, and waste fluid. The fluid transport network and controller are configured such that the controller operates the valves so that, at a first time, fluid may be directed from the source through connected first cells in a forward direction, in series, such that multiple purifications stages may be defined, the first cells forming a series with a first series cell being in a first position of the series and receiving the source fluid, a last series cell being in a last position of the series outputting product fluid, and intermediate series cells. The fluid transport network and controller are configured such that the controller operates the valves so that at said first time, fluid may be directed in a reverse direction through a connected second cell whereby simultaneous multi-stage purification and cell regeneration may be achieved. The fluid transport network and controller are configured to operate the valves to rearrange the connected first cells and the second cell by replacing the last series cell with the second cell and replacing the second cell with the first series cell. The fluid transport network and controller are configured such that the controller operates the valves so that at said second time, fluid may be directed in a reverse direction through second cell, which was the first series cell at the first time. The rearrangement of cells in the series may be accomplished without disconnecting any of the cells from any of the respective cell connectors.

In the embodiment of the last paragraph, the controller may be configured to apply a reverse voltage of the second cell and apply a forward voltage to the first cells. The fluid may be water. The fluid transport network may have water channels and the network is configured to connect to water and water purification cells. The connectors may be adapted for receiving electronic deionization cells. In a variation, the first cells, at the first time, may be at least three in number having the first series cell, the last series cell and intermediate cells ordered by rank in the series; and the intermediate cells, at the second time, may be moved forward in rank so that the first series cell may be replaced by the intermediate cell of a lowest rank. Cells may be connected to said cell connectors to form an embodiment in which the cells are part of the embodiment rather than a system adapted to receive the cells. In the embodiments with cells and without, the controller may be adapted to operate the valves such that each of the cells may be repositioned successively through the series, taking a turn at each rank at respective times and taking a turn as the second cell to be regenerated.

According to embodiments, the disclosed subject matter includes a method of purifying water, which includes flowing water from a source, serially, through a series of electronic deionization (EDI) cells in a forward direction through each cell of the series so that a first cell of the series if of a lowest rank of the series and the last cell of the series may be of a highest rank of the series. The flowing is performed by a controller by controlling automatic valves controlled by the controller. The method includes using the controller and the automatic valves, positioning a freshly-regenerated cell in place of a last cell of said series while repositioning the other cells in the series by moving each cell to a lower rank so that the second rank may be repositioned as the first cell of the series. The method further includes using the controller and the automatic valves, regenerating the last cell by flowing water therethrough in a reverse direction.

In variations of the method of the foregoing embodiment of the last paragraph, the method may include repeating the flowing using the cell regenerated in said regenerated in said regenerating. The method may also include repeating the positioning and the regenerating multiple times so that each cell takes more than one turn at each rank and may be regenerated substantially an equal number of times. each cell may contain more than one water purification module arranged in series or in parallel.

According to embodiments, the disclosed subject matter includes a method of purifying fluid that includes flowing fluid from a source, serially, through a series of cells in a forward direction through each cell of the series so that a first cell of the series if of a lowest rank of the series and the last cell of the series may be of a highest rank of the series. The cells are each adapted to purify fluid flowing therethrough. The flowing is performed by a controller by controlling automatic valves controlled by the controller. The method includes using the controller and the automatic valves, positioning a freshly-regenerated cell in place of a last cell of said series while repositioning the other cells in the series by moving each cell to a lower rank so that the second rank may be repositioned as the first cell of the series. The method includes using the controller and the automatic valves, regenerating the last cell by flowing fluid therethrough in a reverse direction.

The method of the last paragraph may include repeating the flowing using the cell regenerated in said regenerated in said regenerating. The method may include positioning and the regenerating multiple times so that each cell takes more than one turn at each rank and may be regenerated substantially an equal number of times. Each cell may contain more than one fluid purification module arranged in series or in parallel.

According to embodiments, the disclosed subject matter includes a method of purifying fluid including using a controller and a fluid management system, directing fluid through a series of cells to purify the fluid in multiple stages while regenerating at least another cell such that fluid can be purified continuously without interruption for the regenerating. The method includes using the controller and fluid management system, changing the flow paths of the fluid management system so that the directing and regenerating may be effective to subject each cell to an equal load so that each cell may be exhausted at the same time, after being subjected to multiple instances of said regenerating. The changing the flow path may include flowing fluid in a reverse direction through a respective cell during said regenerating and flowing fluid in a forward direction through respective cells during said directing. The fluid may be water and the cells may be electronic deionization cells.

It will be appreciated that the modules, processes, systems, and sections described above can be implemented in hardware, hardware programmed by software, software instruction stored on a non-transitory computer readable medium or a combination of the above. For example, a method for purifying water or other fluids and form maintaining a purification system can be implemented, for example, using a processor configured to execute a sequence of programmed instructions stored on a non-transitory computer readable medium. For example, the processor can include, but not be limited to, a personal computer or workstation or other such computing system that includes a processor, microprocessor, microcontroller device, or is comprised of control logic including integrated circuits such as, for example, an Application Specific Integrated Circuit (ASIC). The instructions can be compiled from source code instructions provided in accordance with a programming language such as Java, C++, C#.net or the like. The instructions can also comprise code and data objects provided in accordance with, for example, the Visual Basic™ language, LabVIEW, or another structured or object-oriented programming language. The sequence of programmed instructions and data associated therewith can be stored in a non-transitory computer-readable medium such as a computer memory or storage device which may be any suitable memory apparatus, such as, but not limited to read-only memory (ROM), programmable read-only memory (PROM), electrically erasable programmable read-only memory (EEPROM), random-access memory (RAM), flash memory, disk drive and the like.

Furthermore, the modules, processes, systems, and sections can be implemented as a single processor or as a distributed processor. Further, it should be appreciated that the steps mentioned above may be performed on a single or distributed processor (single and/or multi-core). Also, the processes, modules, and sub-modules described in the various figures of and for embodiments above may be distributed across multiple computers or systems or may be co-located in a single processor or system. Exemplary structural embodiment alternatives suitable for implementing the modules, sections, systems, means, or processes described herein are provided below.

The modules, processors or systems described above can be implemented as a programmed general purpose computer, an electronic device programmed with microcode, a hard-wired analog logic circuit, software stored on a computer-readable medium or signal, an optical computing device, a networked system of electronic and/or optical devices, a special purpose computing device, an integrated circuit device, a semiconductor chip, and a software module or object stored on a computer-readable medium or signal, for example.

Embodiments of the method and system (or their sub-components or modules), may be implemented on a general-purpose computer, a special-purpose computer, a programmed microprocessor or microcontroller and peripheral integrated circuit element, an ASIC or other integrated circuit, a digital signal processor, a hardwired electronic or logic circuit such as a discrete element circuit, a programmed logic circuit such as a programmable logic device (PLD), programmable logic array (PLA), field-programmable gate array (FPGA), programmable array logic (PAL) device, or the like. In general, any process capable of implementing the functions or steps described herein can be used to implement embodiments of the method, system, or a computer program product (software program stored on a non-transitory computer readable medium).

Furthermore, embodiments of the disclosed method, system, and computer program product may be readily implemented, fully or partially, in software using, for example, object or object-oriented software development environments that provide portable source code that can be used on a variety of computer platforms. Alternatively, embodiments of the disclosed method, system, and computer program product can be implemented partially or fully in hardware using, for example, standard logic circuits or a very-large-scale integration (VLSI) design. Other hardware or software can be used to implement embodiments depending on the speed and/or efficiency requirements of the systems, the particular function, and/or particular software or hardware system, microprocessor, or microcomputer being utilized. Embodiments of the method, system, and computer program product can be implemented in hardware and/or software using any known or later developed systems or structures, devices and/or software by those of ordinary skill in the applicable art from the function description provided herein and with a general basic knowledge of control systems and/or computer programming arts.

Moreover, embodiments of the disclosed method, system, and computer program product can be implemented in software executed on a programmed general purpose computer, a special purpose computer, a microprocessor, or the like.

It is, thus, apparent that there is provided, in accordance with the present disclosure, systems, methods, and devices for purifying fluids. Many alternatives, modifications, and variations are enabled by the present disclosure. Features of the disclosed embodiments can be combined, rearranged, omitted, etc., within the scope of the invention to produce additional embodiments. Furthermore, certain features may sometimes be used to advantage without a corresponding use of other features. Accordingly, Applicants intend to embrace all such alternatives, modifications, equivalents, and variations that are within the spirit and scope of the present invention.

What is claimed is:

1. A system for purifying water, comprising:
a fluid circuit with at least one source water port, at least one product water port, fluid channels, automatic valves (AVs), electronic deionization cell modules (EDCs), and a controller connected to control the AVs and the EDCs, each AV having an inlet and an outlet;
the controller being configured to operate the AVs to define selected flow paths to carry water through the EDCs in a series corresponding to respective selected flow paths whereby the EDCs have ranks from 0 to N, an EDC having a lowest rank in the series (0) receives water from the source water port, the EDC ranks increase along the series, and an EDC having a highest rank in the series (N) supplies water to the product water port;

the controller being configured to operate the AVs periodically to define the selected flow paths to flow a first portion of water from the rank N−1 EDC to the product water port and to flow a second portion of water from the rank N−1 EDC to the rank N EDC in a reverse direction to regenerate the rank N EDC, and the controller further being configured to perform a rotation operation that operates the AVs such that a previous rank 0 EDC is assigned to rank N and is thereby regenerated, and each remaining EDC is assigned to a decremented rank, respectively.

2. The system of claim 1, wherein the controller is configured to repeat the rotation operation.

3. The system of claim 2, wherein, over a plurality of rotation operations, each EDC takes more than one turn at each rank.

4. The system of claim 3, wherein, in the rotation operations, the EDCs are regenerated substantially an equal number of times.

5. The system of claim 4, wherein each EDC includes multiple electronic deionization cells connected in series or in parallel.

6. The system of claim 2, wherein each EDC includes multiple electronic deionization cells connected in series or in parallel.

7. The system of claim 1, wherein each EDC includes multiple electronic deionization cells connected in series or in parallel.

8. The system of claim 1, wherein each EDC includes multiple electronic deionization cells connected in series.

9. The system of claim 1, wherein each EDC includes multiple electronic deionization cells connected in parallel.

10. The system of claim 1, wherein the rotation operation operates the AVs such that each remaining EDC of given rank (R) is assigned to a decremented rank (R−1), respectively.

11. A system for purifying water, comprising:
a fluid circuit with a source water port and a product water port with the source water port being connected to a supply of potable water and the product water port being connected to a purified water-consuming device;

the fluid circuit having fluid channels, automatic valves (AVs), electronic deionization cell modules (EDCs), and a controller connected to control the AVs and the EDCs, each AV having an inlet and an outlet;

the controller being configured to operate the AVs to define selected flow paths to carry water through the EDCs in a series corresponding to respective selected flow paths whereby the EDCs have ranks from 0 to N, an EDC having a lowest rank in the series (0) receives water from the source water port, the EDC ranks increase along the series, and an EDC having a highest rank in the series (N) supplies water to the product water port;

the controller being configured to operate the AVs periodically to define the selected flow paths to flow a first portion of water from the rank N−1 EDC to the product water port and to flow a second portion of water from the rank N−1 EDC to the rank N EDC in a reverse direction to regenerate the rank N EDC, and the controller further being configured to perform a rotation operation that operates the AVs such that a previous rank 0 EDC is assigned to rank N and is thereby regenerated, and each remaining EDC is assigned to a decremented rank, respectively;

wherein the controller is configured to repeat the rotation operation, the repeated rotation operation being such that water is purified and provided to a product water outlet continuously and one or more EDCs are regenerated continuously.

12. The system of claim 11, wherein, in the repeated rotation operations, each EDC takes more than one turn at each rank, each EDC containing multiple electronic deionization cells connected in parallel.

13. The system of claim 12, wherein, in the rotation operations, each EDC takes multiple turns at each rank.

14. The system of claim 13, wherein, in the rotation operations, the EDCs are regenerated substantially an equal number of times.

15. The system of claim 14, wherein each EDC includes multiple electronic deionization cells connected in series or in parallel.

16. The system of claim 13, wherein each EDC includes multiple electronic deionization cells connected in series or in parallel.

17. The system of claim 12, wherein each EDC includes multiple electronic deionization cells connected in series or in parallel.

18. The system of claim 12, wherein each EDC includes multiple electronic deionization cells connected in series.

19. The system of claim 12, wherein each EDC includes multiple electronic deionization cells connected in parallel.

20. The system of claim 11, wherein the rotation operation operates the AVs such that each remaining EDC of given rank (R) is assigned to a decremented rank (R−1), respectively.

* * * * *